US008662556B2

(12) United States Patent
Hagenbuch

(10) Patent No.: US 8,662,556 B2
(45) Date of Patent: Mar. 4, 2014

(54) SYSTEM AND METHOD FOR LIFTING LARGE OFF-HIGHWAY TRUCK-TRUCK BODIES

(76) Inventor: LeRoy G. Hagenbuch, Peoria Heights, IL (US)

( * ) Notice: Subject to any disclaimer, the term of this patent is extended or adjusted under 35 U.S.C. 154(b) by 45 days.

(21) Appl. No.: 13/364,223

(22) Filed: Feb. 1, 2012

(65) Prior Publication Data

US 2012/0195726 A1 Aug. 2, 2012

Related U.S. Application Data

(60) Provisional application No. 61/438,511, filed on Feb. 1, 2011.

(51) Int. Cl.
*B60P 1/64* (2006.01)
*B66C 1/66* (2006.01)

(52) U.S. Cl.
USPC ........ 294/215; 294/82.1; 294/904; 296/184.1

(58) Field of Classification Search
USPC .............. 294/89, 68.1, 68.3, 67.1, 67.3, 82.1, 294/82.11, 215, 904; 410/106, 107, 111, 410/112; 296/43, 184.1
See application file for complete search history.

(56) References Cited

U.S. PATENT DOCUMENTS 1,941,582 A * 1/1934 Schroeder .................... 294/82.1
2,094,407 A * 9/1937 Nampa ........................... 410/21
2,552,219 A * 5/1951 Schleicher .................. 294/82.1
2,812,971 A * 11/1957 Teutsch ........................ 294/82.1
2,915,334 A * 12/1959 Barenyi ........................ 296/204
3,709,156 A * 1/1973 Bowers ......................... 410/111
3,865,048 A * 2/1975 Wallace ........................ 410/111
3,888,190 A * 6/1975 Bigge ........................... 410/101
4,671,554 A 6/1987 Lancelot
5,332,272 A 7/1994 Prince
5,774,948 A * 7/1998 Petschke et al. ......... 24/265 CD
6,102,469 A * 8/2000 Shambeau et al. ......... 296/184.1
6,471,299 B2 10/2002 Brooks, Jr. et al.
6,481,785 B1 11/2002 Coleman et al.
2010/0078950 A1 4/2010 Inda

FOREIGN PATENT DOCUMENTS

FR 2677969 A1 12/1992

OTHER PUBLICATIONS

Search Report and Written Opinion of co-pending International Application No. PCT/US2012/023544.

* cited by examiner

*Primary Examiner* — Dean Kramer
(74) *Attorney, Agent, or Firm* — Leydig, Voit & Mayer Ltd.

(57) ABSTRACT

This invention provides an apparatus and method for safely lifting large off-highway truck bodies and also allows for lifting these truck bodies inside off-highway truck service bays with limited overhead lifting clearances. The invention minimizes the stresses on the truck body and on the lifting cables/slings. This lifting apparatus and method incorporates temporary lifting eyes installed through lifting hole receivers in the truck body floor. The temporary lifting eyes can be designed such that their strength is gained thru interlocking steel members versus simply welding.

21 Claims, 11 Drawing Sheets

SYSTEM AND METHOD FOR LIFTING LARGE OFF-HIGHWAY TRUCK-TRUCK BODIES

CROSS-REFERENCE TO RELATED APPLICATIONS

This patent application claims the benefit of U.S. Provisional Patent Application No. 61/438,511, filed Feb. 1, 2011, which is incorporated by reference in its entirety.

TECHNICAL FIELD OF THE INVENTION

The invention generally relates to heavy duty off-highway trucks, with payload carrying capacities of up to 400 ton or more, and particularly to the bodies of these off-highway trucks. In particular, the invention relates to a system for hooking up a lifting device such as a mobile crane or overhead bridge crane to off-highway truck bodies for lifting them off of an off-highway truck chassis.

BACKGROUND OF THE INVENTION

Today, off-highway trucks can have carrying capacities of 400 ton plus payloads. As such, these large trucks require very large truck bodies and in fact truck bodies on large 300 and 400 ton class capacity off-highway trucks often weigh in excess of 100,000 pounds or 50 tons. Periodically, it is necessary to remove these truck bodies from their truck chassis so that the bodies can be repaired or rebuilt and/or the truck chassis can be worked on. Repair or rebuilding of these truck bodies is often required, as the loading tools and the material being loaded/hauled in these truck bodies can over time cause substantial damage or abuse to the truck bodies. Also, some of the materials hauled in these truck bodies can be extremely hard and abrasive such as various hardrock ores, iron, copper, gold, etc. As such, these materials wear on the truck body floors and sides, thus requiring these truck bodies to periodically be lined/relined with abrasion resisting steel plate or like material and accordingly be rebuilt on occasion.

Additionally, often times it is necessary to remove a truck body for servicing of the truck chassis. Again, these truck bodies on large off-highway trucks are very large, approaching thirty feet wide and fifty feet in length; the truck bodies are in fact very large weldments.

Today the typical way to lift a truck body is to hook slings or cables to lifting eyes or lifting lugs on the sidewalls of the truck body and extend the slings or cables over the top of the truck body sidewalk to a point in the center of the truck body. To minimize the stresses on the truck body sidewalls, these slings or cables are attached to the truck body sidewalls at four points—two on either side of the truck body—and they are typically gathered to a central hook point. The cables are typically angled upwardly at a minimum angle of forty five (45) degrees (or greater) from horizontal, which results in the central hook point (lifting hook) on a thirty (30) foot wide truck body being at a height of half of the truck body width or fifteen feet above the truck body sidewalk.

In today's off-highway truck maintenance repair facilities 15 feet of overhead clearance or overhead crane lift clearance for lifting a truck body clear of the off-highway truck chassis when the slings are at this forty five (45) degree (or greater) angle is typically not available. Additionally, often times today where there is limited overhead clearance in the maintenance repair facility, two overhead bridge cranes have to be used. The two cranes are positioned on opposing sides of the truck body to minimize the amount of hook height needed to lift the truck body. But many times this still does not provide enough free overhead bridge crane hook height.

Additionally, over a truck body's life the truck body sidewalls may weaken particularly because of the hauled material abrasion and the repeated impact from the material being hauled in the truck body. Also the body sidewalls in large 300 and 400 ton ultra class payload trucks are often nine to ten feet deep. So when hooking to/over these body sidewalk, with slings or cables from each of the four corners of the body, which are collected at a central lifting point in the body center, extreme stresses are put on the sidewalls, pulling them inwardly. Users and operators of lifting rigs using this method are concerned with using the lifting points in the body sidewalls typically incorporated in the off-highway truck manufactures' standard truck bodies. The users and operators are concerned that over time the body sidewalls will weaken and not be able to withstand the compressive forces pulling inwardly on the sidewalls as a result of the slinging and hooking over the top of the body sidewalls from a lifting hook to attachment points on the body sidewalk.

In fact, many mines refuse to hook to body sides in lifting large truck bodies off their truck chassis. Rather, they weld lifting eyes to the truck body floor at some lesser distance apart than the overall truck body width. If the truck body width is thirty feet, these lifting eyes may be welded eighteen feet apart or nine feet from the center of the truck body. So when cables/slings are hooked to these lifting eyes and collected at a central point, an overhead bridge crane does not need nearly as much height under its hook to be able to lift the truck body.

Typically the overhead bridge cranes in truck service/maintenance facilities are of a fifty, sixty ton, or higher lifting capacity. Such an overhead bridge crane can lift a truck body where minimal free hook lifting height is available. Today, the options are either to hook to the original lifting points mounted in the truck body sidewalls, slinging over the sides of the truck body to a central point over the center of the truck body or, as many mines do, weld lifting eyes to the truck body floor and rely on the quality of those welds to lift a body. The welded lifting eyes need a much lower hook height such as what exists under the overhead bridge cranes in many off-highway service/maintenance facilities. However, the weld required to support the weight of the body is substantial. Repeated fastening of lifting points to the body floor by welding lifting points to the floor risks degrading the structural integrity of the floor, making the lifting of the body from the floor less desirable despite its clear mechanical advantage compared to lifting from the sidewalls.

Furthermore, if the existing lifting points on the truck body sidewalls are used and the cables or slings are passed over the truck body sidewalls, workers often have to climb up to the outside of the truck body sidewall, which is often in excess of 20 feet off the ground, to attach the lifting sling or cable hook to the truck body sidewall lifting points.

SUMMARY OF THE INVENTION

An aspect of the present invention is to provide a means to safely hook to and lift off highway truck bodies of a truck chassis through the use of temporary lifting eyes inserted into truck body floor receiver holes. In the design of the truck body, receiver holes are left in the truck body floor and when lifting a truck body off of a truck chassis, temporary lifting eyes are inserted in these receiver holes. For existing truck bodies, the receiver holes can be retrofitted into their floors.

The temporary lifting eyes can include interlocking plates with a lifting attachment hole in one plate. The temporary lifting eye interlocking plate arrangement will not come through the truck body floor receiver hole. Therefore, these temporary lifting eyes can hook up to cabling and lift a truck body from the truck body floor.

When hooking lift cabling or rigging up to the temporary lifting eyes to lift a truck body, a worker can stand inside the truck body on the truck body floor and easily control the hooking up of the slings/cables to a lifting device, such as a mobile crane or overhead bridge crane, for lifting the truck body. The temporary lifting eye receiver holes can be located close to the four corners of the truck body floor.

The temporary lifting eyes are inserted into the receiver holes from underneath the truck body floor. With the truck body on a truck chassis, the rear edge of the truck body floor is often 14 feet or more off the ground, and it may be desirable to use safety ladders when inserting the temporary lifting eyes thru the truck body receiver holes from the ground. However, once the temporary lifting eyes are inserted into the body floor receiver holes, then all other lifting rigging can be done from inside the truck body, which is much safer than climbing up to the truck body sidewalls to hook the lifting cables/slings.

Accordingly, embodiments of the invention provide a safe means to rig a truck body for lifting through the use of temporary lifting eyes inserted from underneath the truck body floor through the body floor receiver holes such that the temporary lifting eyes can be hooked to cables/slings and subsequently to an overhead bridge crane or a mobile crane hook. These temporary lifting eyes can be first inserted in the truck body floor and then slings/cables inside the truck body can be hooked up to suitable lifting equipment.

When the temporary lifting eyes are not in use, they can be removed and in certain embodiments cover plates for the receiver holes are placed in the receiver holes. A retainer bar attached to each cover plate can hold the plate in place so that the inside of the truck body is basically smooth and the receiver holes are closed. The truck body can then operate normally.

The temporary lifting eyes can be designed to rotate in the body floor receiver holes so as to line up in the pulling directions of the lifting cables or slings. When the temporary lifting eyes are inserted through the body floor receiver holes, a retainer pin can be used to hold them up until lifting rigging is attached to the temporary lifting eyes.

The temporary lifting eyes may take many forms with more than one hole in the portion of the temporary lifting eye that protrudes upwardly through the truck body floor receiver hole so that lifting sling/cable can be hooked up to the temporary lifting eye in a manner that pulls them tight against the truck body floor receiver hole.

The advantages of embodiments of this system are particularly apparent to off-highway truck users and mine operators whose standard operating practice is to lift truck bodies using temporary attachment points welded to the truck body floor, since this system can prevent body lifting stresses weakening of the body sidewalls.

The invention is a much safer way to lift truck bodies than the above-described alternative methods, since the system and method of the present invention allows for a desirable lower lifting height and enables repeated lifting of the truck body from points in the floor without repeated welding and removing of lifting points to the floor, which over time raises a concern of the floor's structural integrity.

BRIEF DESCRIPTION OF THE DRAWINGS

The drawings of the application as described below provide a complete description of specific and presently preferred embodiments of the invention.

DETAILED DESCRIPTION OF EMBODIMENTS

FIGS. 1 through 11 illustrate several views and embodiments of a system for lifting a truck body from a truck chassis. The illustrated system includes a plurality of receiver holes that are disposed in the floor of the truck body and that receive temporary lifting eyes for attaching to hoisting lines. At least three receiver holes are required for stability in lifting the truck body by the hoisting lines. A perimeter area defined by lines connecting the receiver holes must include the center of gravity of the truck body for stability in lifting the truck body.

Each lifting eye includes a support base whose diameter is larger than a diameter of an opening of the mating receiver hole. During operation, each support base is biased against the underside of the truck body floor as a result of the tension in the hoisting lines. The larger diameter of the support base prevents the lifting eye from passing up through the opening of the receiver hole. When tension is applied to the hoisting line, a post disposed on top of each support base extends up through the opening of the receiver hole, making the post accessible from above the truck body floor. Each post includes an attachment for connection to one of the hoisting lines. Once all of the lifting eyes are fitted through openings of the receiver holes and connected to hoisting lines, the truck body is safely lifted off the chassis of the truck at a point where the hoisting lines meet. The tensile lifting force is transmitted through the hoisting lines to the lifting eyes, each of which lift the truck body from below using the respective support base.

Each of the support bases is preferably sized and shaped so that when it engages the opening of the mating receiver hole it interacts with the edges of the floor defining the opening so as to form a ball and socket arrangement. The lift eye is free to rotate and pivot in three dimensions. This freedom assists in reducing the amount of twisting of the hoisting lines, which in turn relieves torque at the lifting eye, thus helping the stability of the system. The three dimensional movement also enables the lifting eye to align itself automatically with the tension in the hoisting lines, which gives additional stability and strength to the body lifting system.

Figure 1:
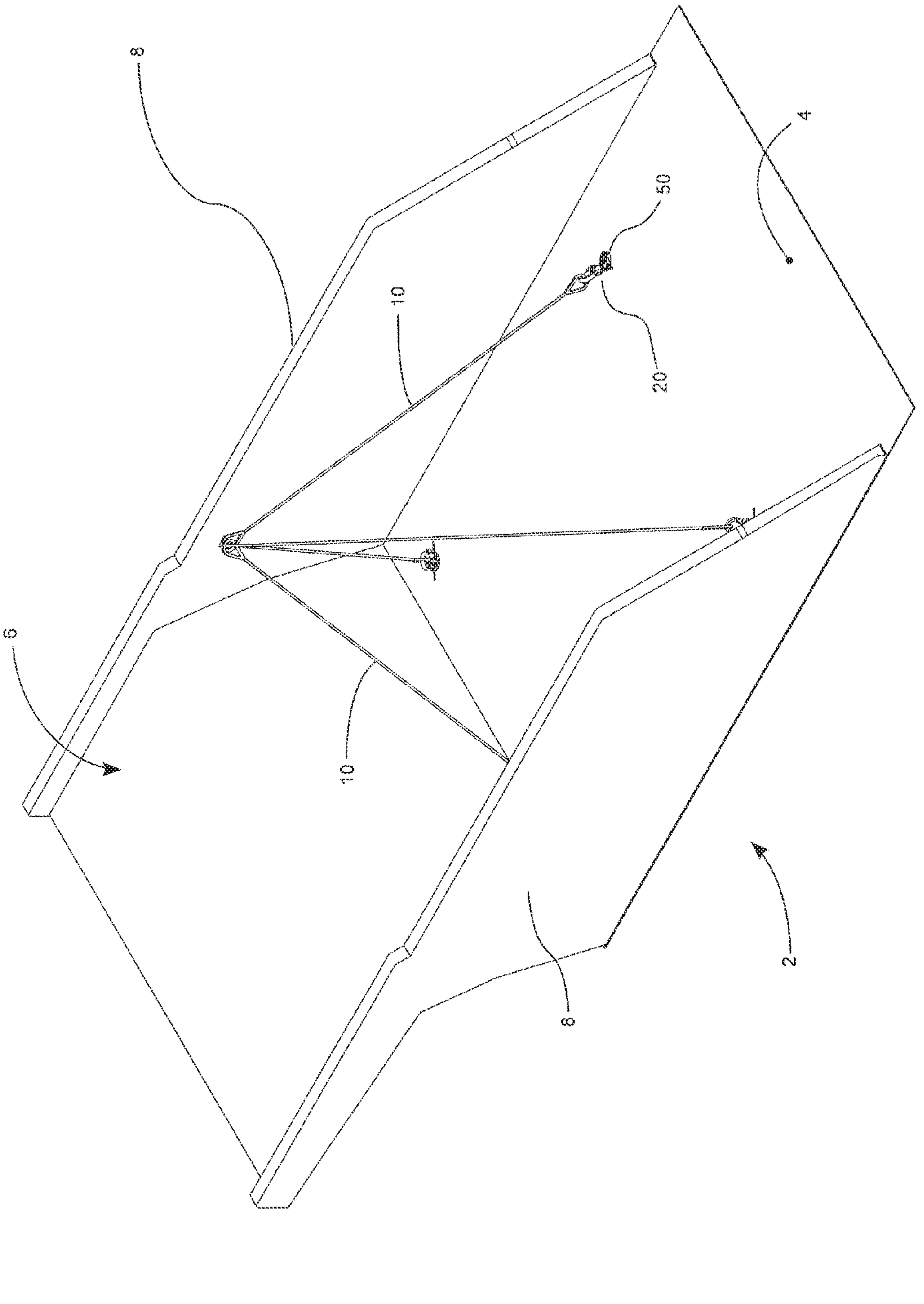
FIG. 1 is a perspective view of a truck body with a group of cables attached to temporary lifting eyes extending through a floor of the truck body.
Figure 2:
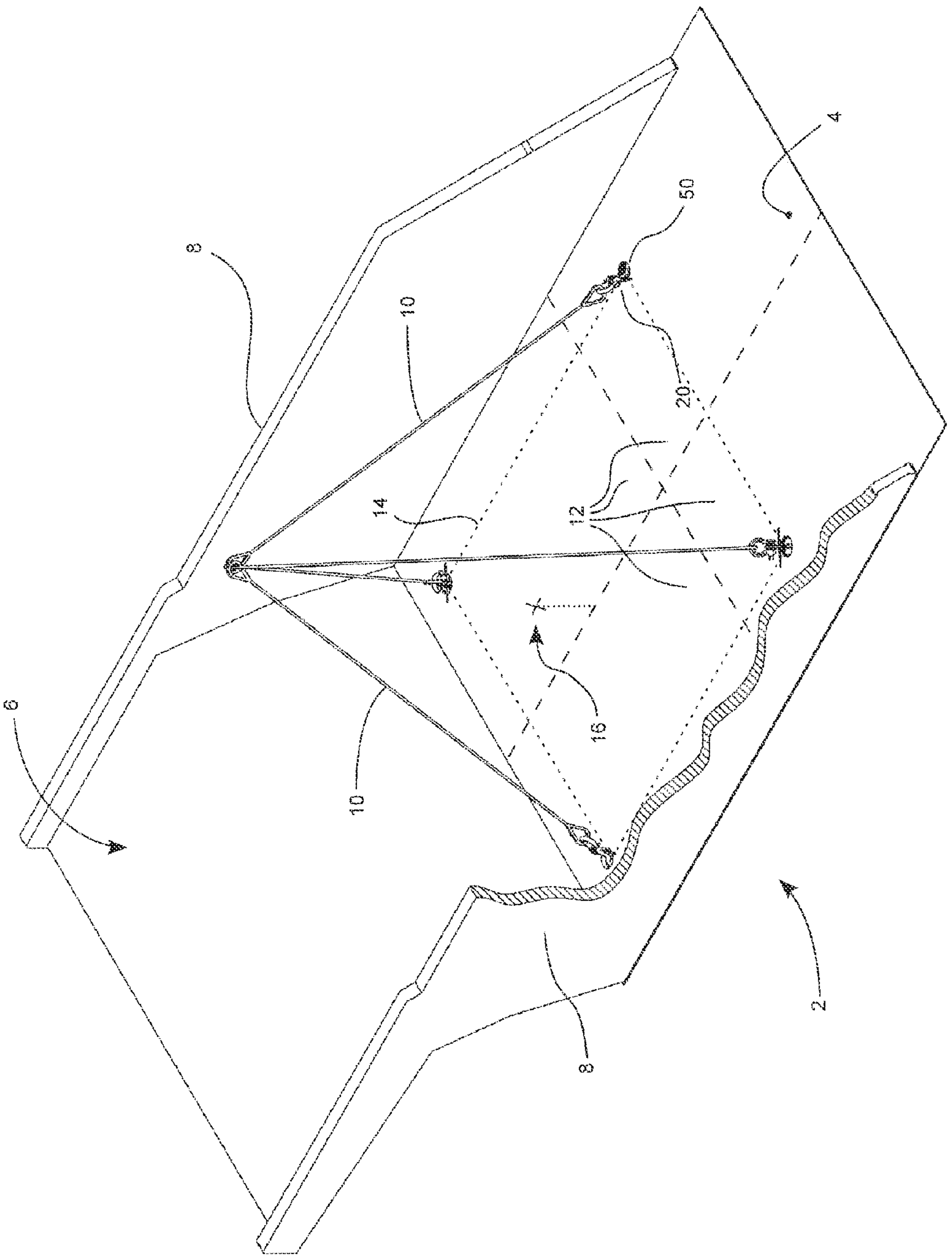
FIG. 2 is another view of the truck body of FIG. 1, with a side wall of the truck body partially cut away.

FIGS. 1 and 2 illustrate an exemplary embodiment of the system for lifting a truck body 2. In this illustrated embodiment, four receiving holes and four mated lifting eyes are shown. However, as few as three pairs of lifting eyes and receiving holes can be in the system. The maximum number is only limited by practical consideration.

The truck body 2 includes a floor 4, a front 6 and side walls 8 extending up from the floor 6. The system is configured to lift the truck body 2 from the floor 4 without placing unnecessary stresses on the side walls 8, or the truck body 2 as a whole. The system is primarily aimed at lifting bodies of off-highway trucks whose weights vary from 20,000 pounds or less to about 130,000 pounds or more. Alternatively, it is also possible to use this system for smaller loads, such as the beds of on-highway trucks or railroad freight cars.

Referring to the drawings, the floor 4 of the truck body 2 includes four receiver holes 50 through which four respective lifting eyes 20 upwardly extend from below the floor 4. Each of the hoisting lines 10, in the form of cables, is attached to one of the lifting eyes 20 and extends up to a height where it can be connected to a lifting device, such as a hook on a crane. Various different constructions can be used for the hoisting lines 10, including wire rope, chains, fibrous ropes or cords. In the illustrated embodiment, the four hoisting lines or cables 10 are assembled at a single location that then mates to the lifting device such as a crane (not shown) or other conventional lifting machine; however, multiple lifting devices could equally well be employed with the lifting system.

Due to the positioning of the lifting eyes 20 in the floor 4 of the truck body 2, the hoisting lines 10 can take a relatively steep angle to where they are gathered together and mated to the lifting device, thus enabling the device to minimize its vertical extension and overall height above the height of the truck body 2 and allowing the system to be used in locations where height is a concern, such as in certain repair facilities. Lateral forces on the body are relieved by the rotational and pivoting actions of the support bases. Where such forces exist, they are applied to parts of the body that are capable of withstanding repeated exposure to them without compromise. Specifically, a lateral force is transmitted along the length of the floor when the body is lifted. But the structure of the floor is designed for its haulage function such that lateral forces along the floor do not compromise the structural integrity of the floor and, therefore, they also do not compromise the overall body's structural integrity.

As an alternative to joining the hoisting lines 10 together, it is also possible to use a lifting device designed to hold the lifting cables in a spaced-apart configuration, such as four-point lifting beam (not shown). This enables the lifting device to be disposed even lower with respect to the height of the truck body 2.

As shown in FIG. 2, each of the four receiver holes 50 is disposed in a quadrant 12 of the floor 4 of the truck body 2. Accordingly, the lifting eyes 20 and hoisting lines 10 are able to hoist the truck body 2 from positions near the four corners of the truck body floor 4, which allows the truck body 2 to be carefully controlled during lifting. Adding to the stability of the truck body 2 during lifting, the lines 14 connecting the four receiver holes 50 define a perimeter of an area including a point in vertical alignment with a center of gravity 16 of the truck body. By ensuring a placement of the receiver holes 50 such that the perimeter of the area defined by the connecting lines 14 includes the point vertically aligned with the center of gravity, the truck body 2 has a controllable torque about the center of gravity. Of course, ideally, the point on the surface of the floor 4 vertically aligned with the center of gravity is at the geometric center of the area defined by the lines 14.

Balancing the truck body 2 can also be maintained by varying the lengths of the hoisting lines 10. For example, if the center of gravity 16 lies closer to a first pair of the receiver holes 50, the hoisting lines 10 to this pair of holes may be made shorter, while the hoisting lines 10 to the second pair of receiver holes 50 are made longer. As mentioned above, it is also possible to use fewer or more than four receiver holes 50 in the lifting system. Regardless, the lifting system functions similarly to the illustrated embodiment, such that the location of the holes 50 define corners of a geometric shape on the floor 4 of the body 2 whose area includes the center of gravity 16 of the truck body 2. It is also possible to use two or even one receiver hole 50 with additional hoisting lines 10 being primarily for the purpose of providing stability. For example, a single receiving hole can be located in line with the center of gravity of the body 2 and stabilizing lines can flare from where the hoisting line 10 mates to the lifting device to fasteners on the body that may not need to include openings in the floor. However, such an embodiment does not have the stability of the illustrated embodiment. Normal use of the body may shift the center of gravity away from the single opening, causing difficulties in relying on the stabilizing lines and a single hoisting line 10.

Figure 3:
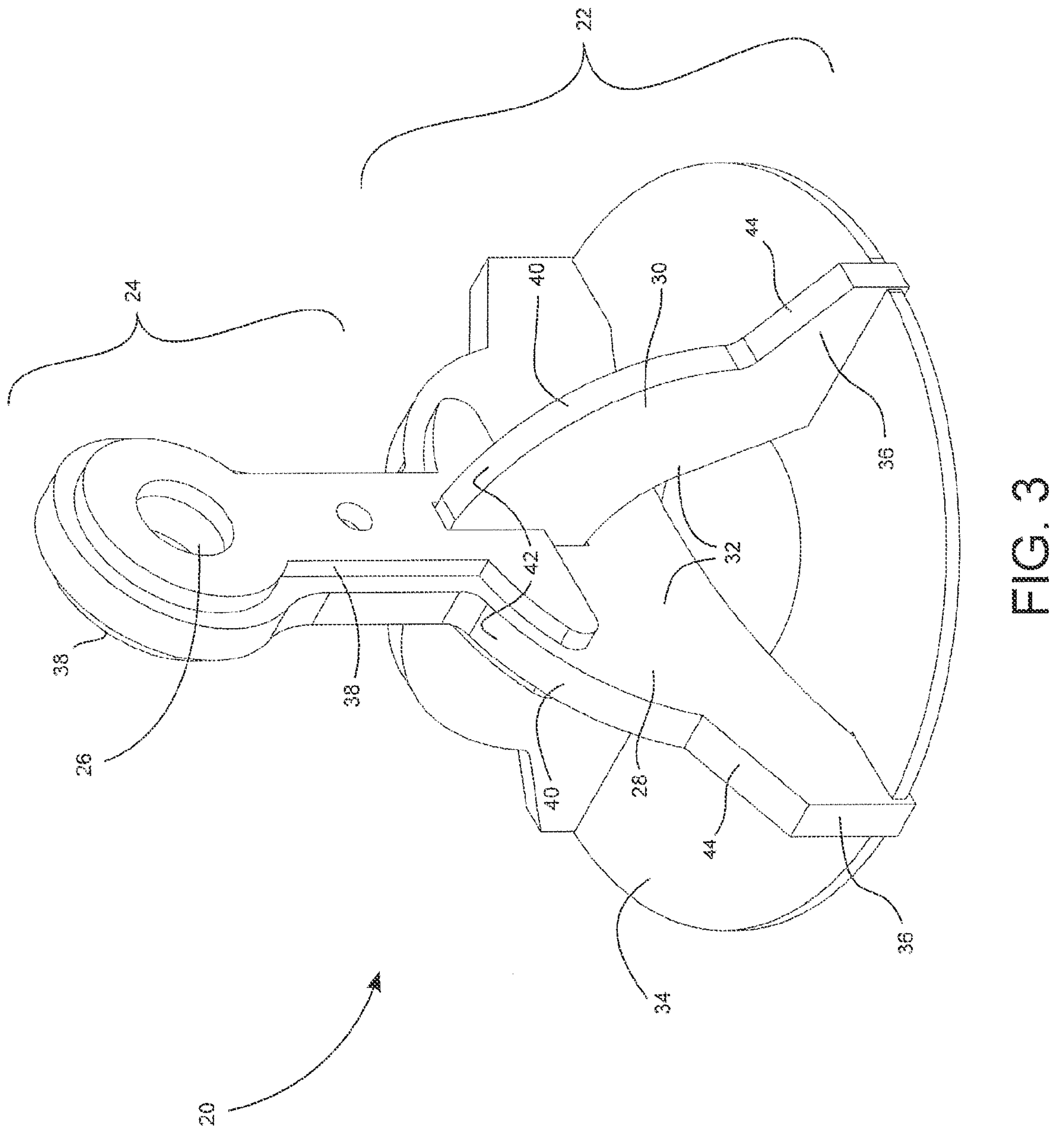
FIG. 3 is a perspective view of a temporary lifting eye.

FIG. 3 shows a specific embodiment of a lifting eye 20 for use with the lifting system. The lifting eye 20 has a support base 22 and a post 24 extending therefrom that includes an attachment 26. The diameter of the support base 22 is larger than the opening provided by the receiver hole 50 so that the lifting eye 20 is unable to pass entirely through the receiver hole 50. Instead, only the post 24 extends up through the receiver hole 50 so that the attachment 26 is accessible from above the truck body floor 4. During use, the hoisting line 10 connects to the attachment 26. Tension applied to the hoisting line brings the support base 22 in contact with the underside of the floor 4. The lifting force from the lifting device travels along the hoisting line 10 and transfers to the body at the interface between the floor 4 and lifting eye 20, which is where the support base mates to the edges of the opening in the receiving hole 50. The illustrated attachment 26 is in the form of a hole within the post 24. However, it is also possible that the attachment be formed as a hook, or be formed by a separate loop fixed to the post 24. Moreover, while the attachment 26 of the illustrated lifting eye 20 is formed on the post 24, it is also possible for the attachment 26 to be disposed on or extending directly from the support base 22, so long as a hoisting line 10 connected to the lifting eye 20 extends up from the attachment 26 to the desired lifting device, such as a crane.

The lifting eye 20 is formed by two plates 28, 30 disposed at a right angle from one another. These plates provide the "ball" of the ball and socket joint formed when the lifting eye 20 mates to the opening of a receiver hole 50. The additional plates could be added, with the extreme being a continuous ball that mates to the circular opening of the receiver hole 50. However, too much surface contact between the support base and the opening of the receiver hole 50 may introduce frictional forces of sufficient magnitude to inhibit rotation and pivoting of the lifting eye 20 in the receiver hole 50. The four points of contact between the lifting eye 20 and the receiver hole 50 provide the needed stability and robustness of the joint while keeping the frictional forces resisting rotation and pivoting of the lifting eye to a minimum. Although three points of contact would also work equally well.

In the illustrated embodiment, each of the two plates 28, 30 includes two legs 32 that extend outwardly from a central axis of the lifting eye 20, forming a body of the support base 22. At the bottom of the support base 22, a reinforcement bracket 34 extends around the legs 32, in the form of a ring, connecting to feet 36 of each of the legs 22. The feet are equally spaced about the lifting eye, so that each foot is separated from an adjacent foot by 90 degrees. In an alternative embodiment, there may be as few as three of these feet 36, which would then also preferably be equally spaced so as to be separated from each other at about 120 degree angles.

The reinforcement bracket 34 is thus able to strengthen the support base 22 and maintain the position of the individual legs 32. In the illustrated embodiment, the feet 36 pass through corresponding notches in the reinforcement bracket 34. However, it is also possible for the feet 36 to abut a top surface of the bracket 34. The components of the lifting eye can be made from any suitably strong material. Steel components, particularly steel plates 28, 30 are preferred.

One of the plates takes the form of a primary plate 28 and extends up from the support base 22 to also form the post 24. For added support, strengthening plates 38 are disposed on the sides of the primary plate 28, effectively increasing the thickness of the post 24 of the lifting eye 20. Preferably, these strengthening plates 38 also extend around the attachment hole 26. For further support, a portion of the primary plate 28 extends below the secondary plate 30 absorbing more of the load during hoisting. The two plates 28, 30 can be of equal or different thickness. For example, the primary plate 28 can be thicker than the secondary plate 30, as shown in FIG. 3. Secondary plate 30 can interlock with primary plate 28 by passing through an opening in the center of the primary plate. Alternatively, the secondary plate 30 can be replaced by individual legs 32 attached to the primary plate 28. In this regard, it would also be possible for the support base 22 to include more than four legs by having additional secondary plates or individual legs attached to the primary plate. Each of the described parts of the lifting eye 20 can be formed by separate components that are attached to one another, for example by welding. Alternatively, individual portions or the entire body of the lifting eye 20 can be formed in one piece, for example as a molded part.

The tops of the legs 32 of each of the primary and secondary plates 28, 30 form bearing faces 40 for engaging a receiving surface 58 (see FIG. 4) of the receiver holes 50. Collectively, the bearing faces 40 form a rounded bearing surface 42 that can rotate within the receiving surface 54 of the receiver holes 50. This allows the lifting eye 20 to tilt within the respective receiver hole 50 as the hoisting line 10 pulls upward (see FIG. 6), reducing torque on the lifting eye and the floor 4, which reduces stress within these components. The bearing surface 42 is preferably spherical to allow it to rotate evenly within the receiver hole 50 regardless of the direction of pull by the hoisting line 10. The term spherical is used herein to indicate that the surface is rounded in three dimensions and substantially similar to the surface of a ball or an egg, but is not limited to the shape of a perfect sphere. However, in some embodiments, the bearing faces 40 can be designed to form a bearing surface 40 that has the shape of a portion of a perfect sphere.

The feet 36 can also accommodate the tilting of the lifting eye 20 by including a top surface 44 that is angled downward from the bearing face 40 toward the reinforcing bracket 34 at the bottom of the support base 22. The angled top surface 44 of the respective foot 36 provides a limit to the amount that the lifting eye 20 can be rotated within the receiver hole 50, but also provides a suitable stop surface at the rotation limit. For example, the top surface 44 can be angled to be substantially parallel with the truck body floor 4 when the lifting eye 20 reaches the maximum rotational limit. Accordingly, the surface 44 of the foot 36 will rest flatly against a corresponding surface at the receiver hole, thereby preventing stress on a single point within the lifting eye.

Figure 4:
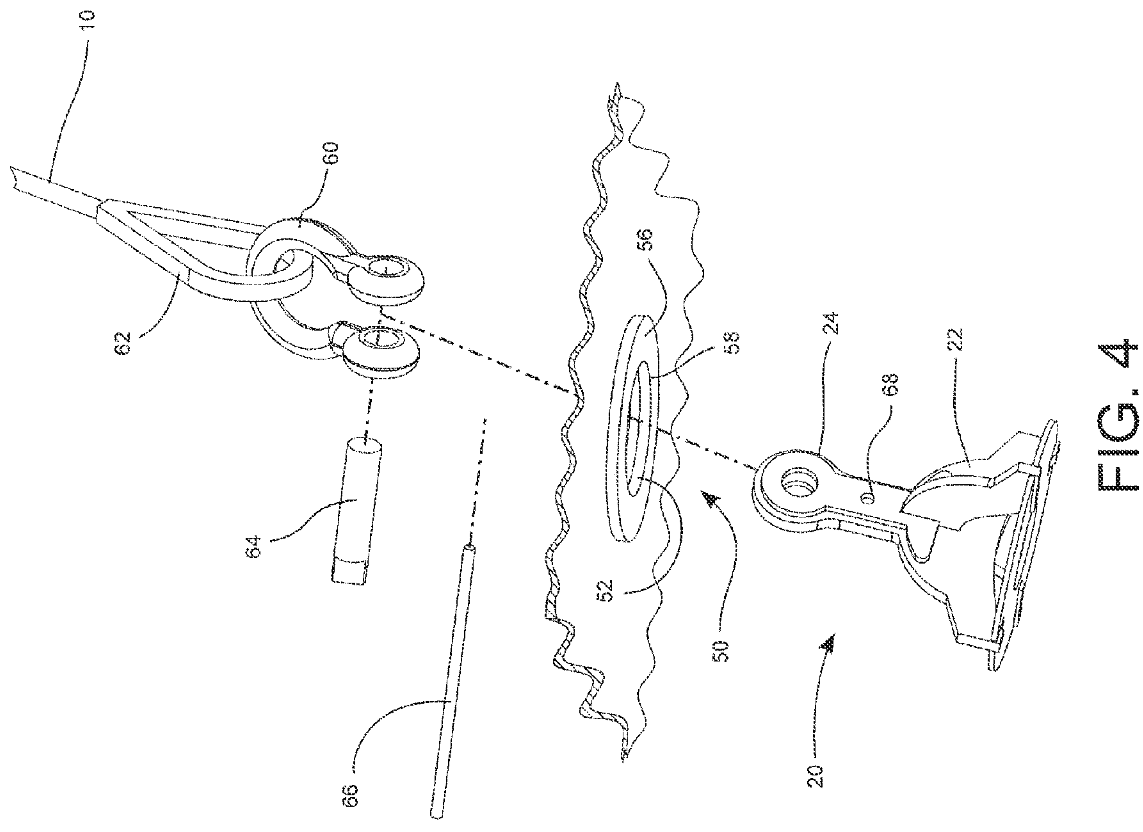
FIG. 4 is an exploded view of a temporary lifting eye, a cable attachment, and a portion of a truck body floor.
Figure 5:
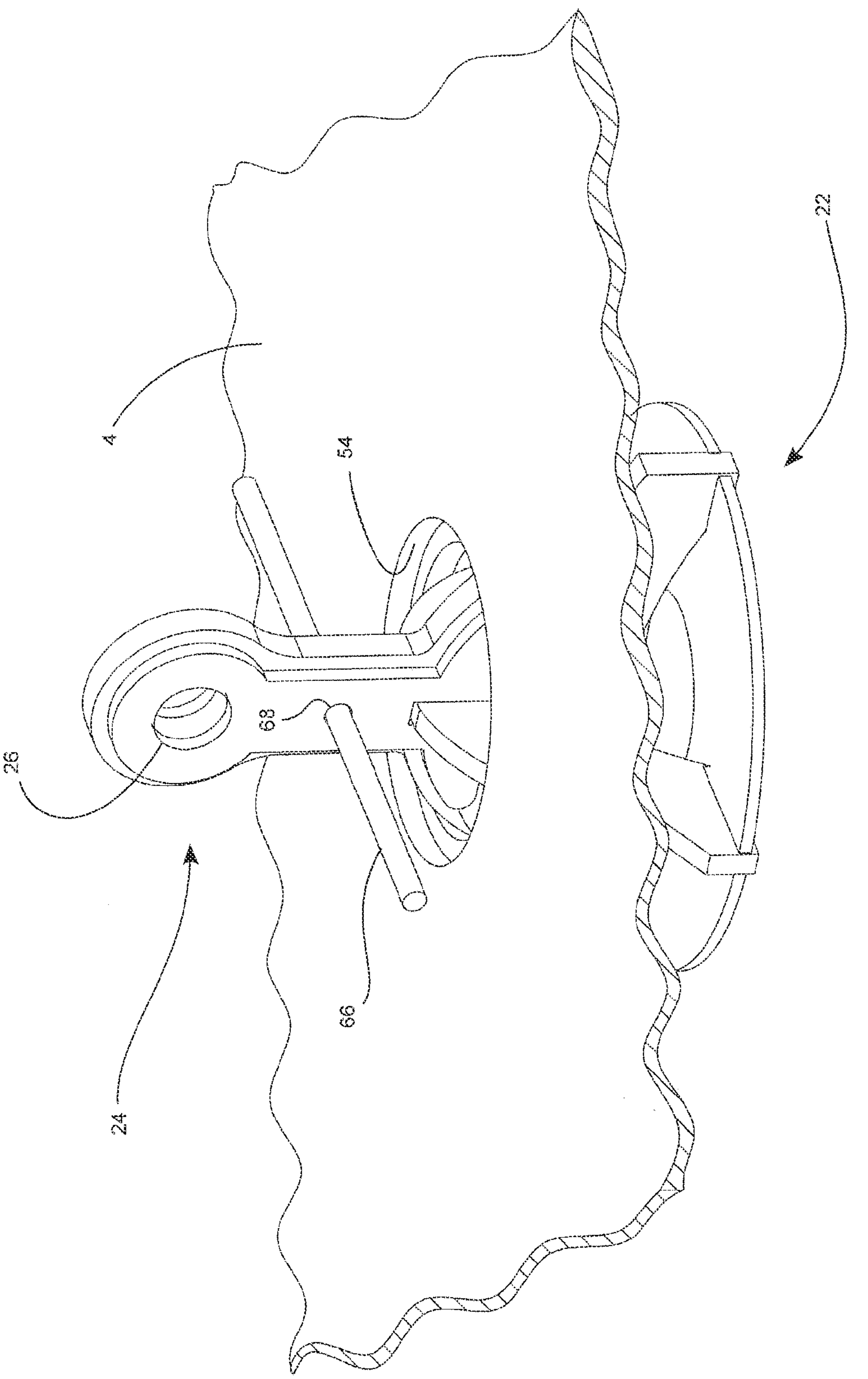
FIG. 5 is a perspective view of a temporary lifting eye mating with a receiver hole in a truck body floor.
Figure 6:
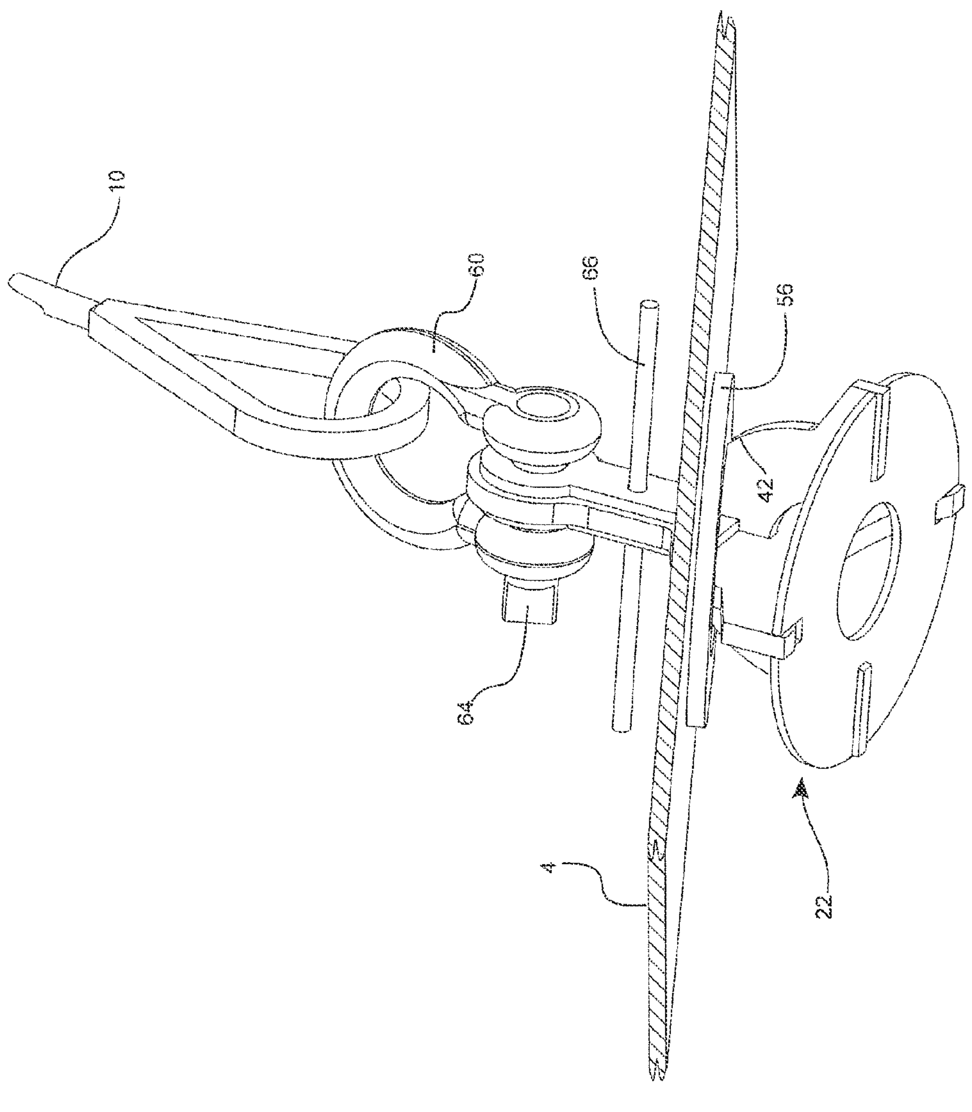
FIG. 6 is a perspective view, from below, of a temporary lifting eye mating with a receiver hole in a truck body floor.
Figure 7:
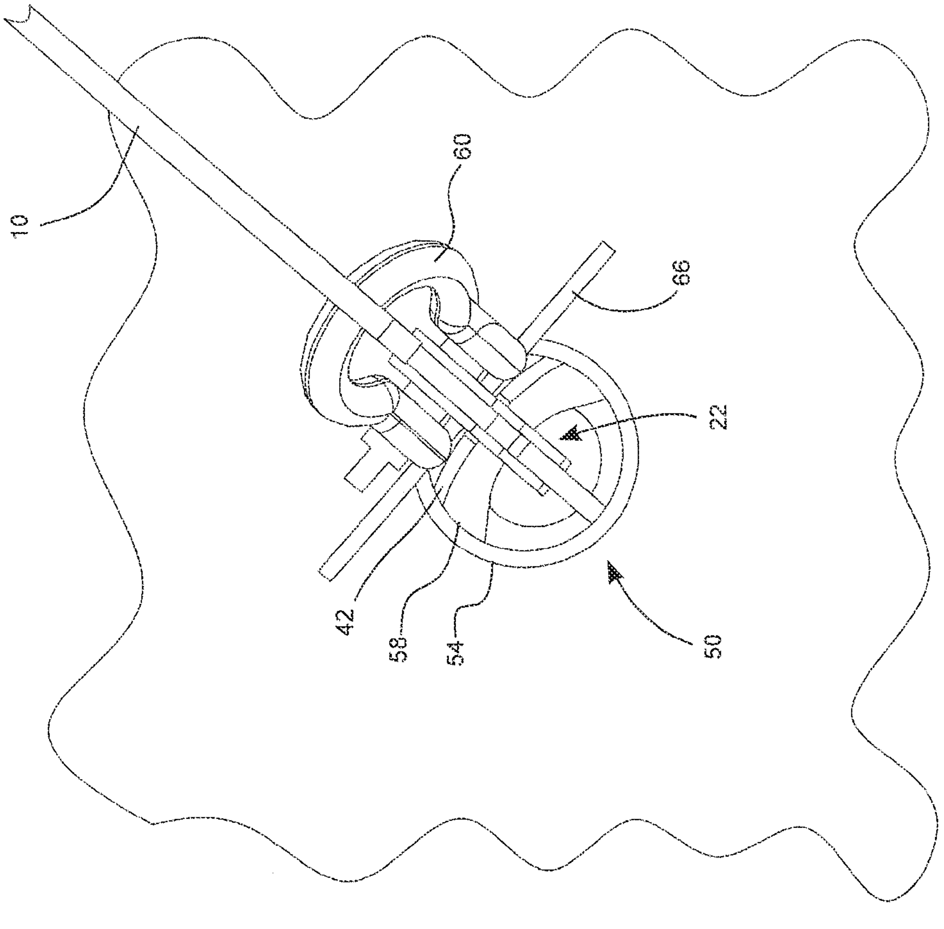
FIG. 7 is a top view of a temporary lifting eye mating with a receiver hole of a truck body floor.
Figure 8:
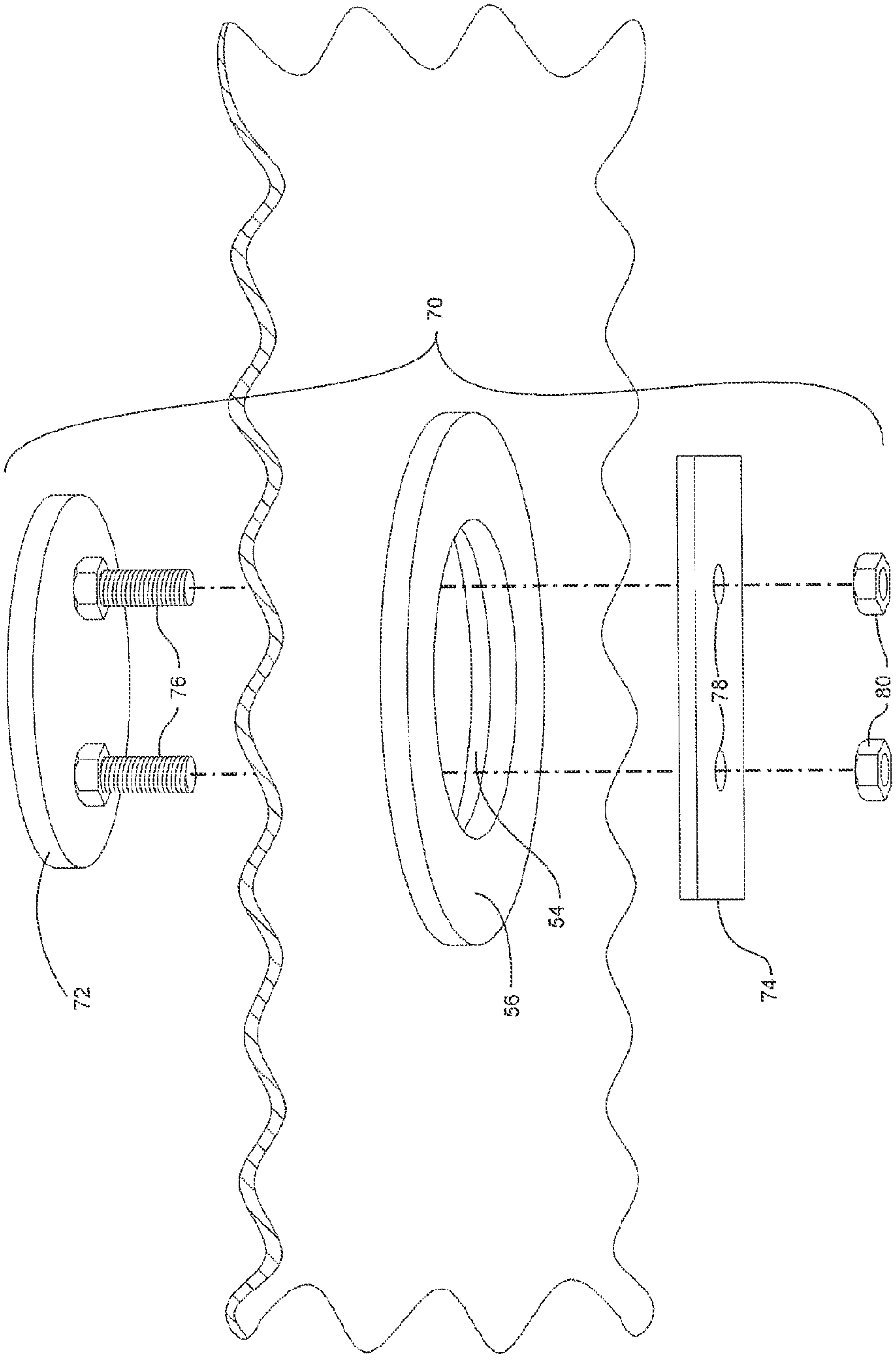
FIG. 8 is an exploded view of a closure device used with a receiver hole in a truck body floor.
Figure 9:
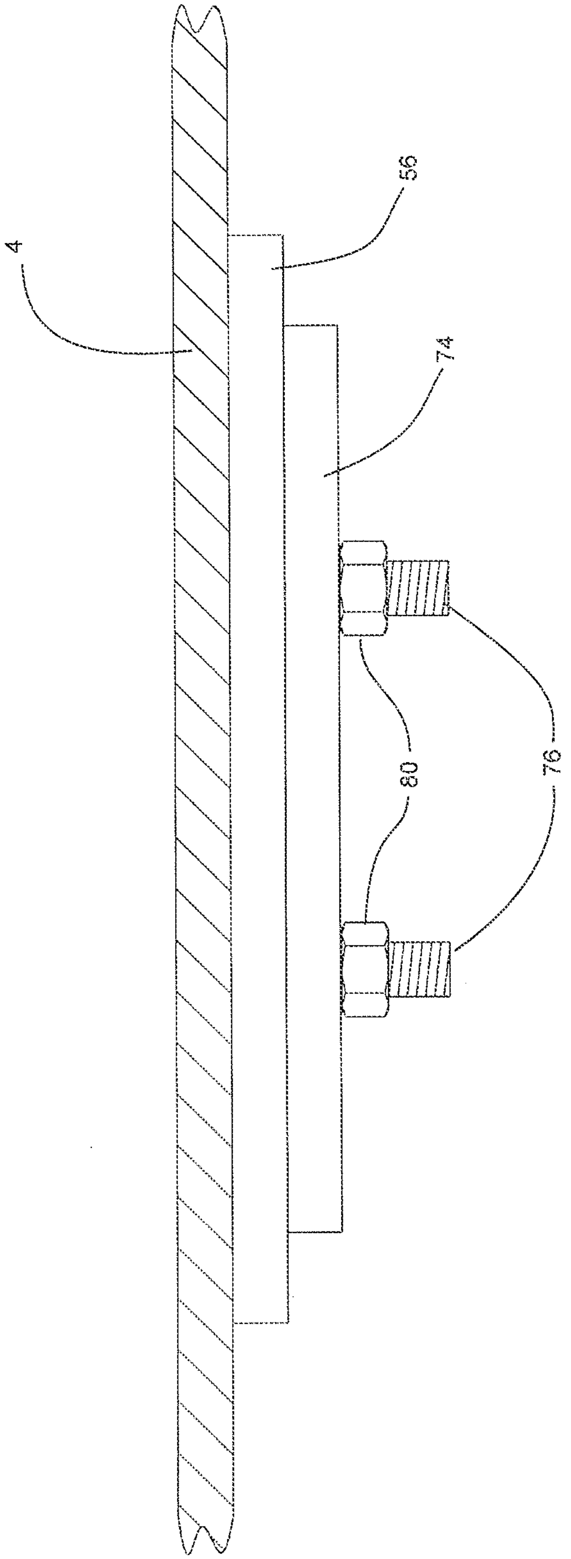
FIG. 9 is a side view of the closure device of FIG. 8 in an assembled position.

FIG. 4 illustrates an exemplary embodiment for securing the truck body floor 4 to a hoisting line 10 using the lifting eye 20. To assemble the arrangement, the upper post 24 of the lifting eye 20 is passed through the receiver hole 50, which engages the support base 22. An anchor shackle 60, secured to a looped end 62 of the hoisting line 10, is then connected to the post 24 by passing a pin 64 of the anchor shackle through the attachment hole 26.

The receiver hole 50 provides an opening 52 for the post 24 of the lifting eye 20 but must be small enough to prevent the entire lifting eye 20 from passing through. Accordingly, the size of the support base 22 is designed to prevent the support base 22 from passing through the opening 52 of the receiver hole 50. If opening 52 of the receiver hole 50 is circular, as in the illustrated embodiment, this can be achieved by making the diameter of the opening 52 of the receiver hole 50 smaller than a diameter of the support base 22, particularly smaller than the bearing surface 42. Alternatively, other complementary shapes can define the opening 52 of the receiver hole 50 and the support base 22 of the lifting eye 20 that prevent passage of the support base 22 through the opening 52 of the receiver hole 50. However, the shapes must allow for at least limited ball and socket action to relieve twisting forces along the hoisting lines 10 and to generally align a main axis of the lifting eye with the lifting force. Alternatively, if the shapes do not allow for adequate release of twisting and/or alignment of the lifting eye 20 with the lifting force, a ball and socket universal joint could be added in the area of the upper post 24.

When the lifting eyes 20 and hoisting lines 10 are assembled and used to lift the truck body 2, the receiver holes 50 should provide the support necessary to lift the truck body 2. Accordingly, the receiver holes 50 can include annular reinforcement plates 56 that bear direct contact with the lifting eyes 20 and distribute the lifting force to a larger area of the truck body floor 4. In the illustrated embodiment, the receiving surface 58 of the receiver hole 50 is disposed on the reinforcing plate 56 so as to prevent direct contact of the lifting eye with the truck body floor 4. Accordingly, the bearing surface 42, formed by the individual bearing faces 40 of the support base legs 30, engages the receiving surface 58 of a respective receiver hole 50. The reinforcing plates 56 can, however, be omitted and the receiving surface 58 be disposed directly on the opening 54 in the truck body floor 4.

The receiver holes 50 are formed by providing an opening 54 in the floor 4 of the truck body 2 and a receiving surface 58 for the lifting eye 20. The formation of the opening 54, for example by Computer Numerically Controlled cutting equipment such as laser/plasma or boring, can be carried out during the manufacture of the truck body, either before or after assembling the parts of the truck body, or it can be carried out on a completed truck body 2. Accordingly, it is possible to use this lifting system with an existing truck body by retrofitting it with the desired receiver holes 50. As explained above, a reinforcing plate 56 can be disposed around each opening 54 in the truck body floor 4 to provide the respective receiving surface 58 and provide added support to the receiver hole, or the openings 54 themselves can form the receiving surfaces 58. The reinforcing plates 56 can also be constructed during or after manufacture of the truck body 2.

During installation of the lifting eyes 20, a retainer 66, through hole 68 can be used to hold the lifting eye 20 in place within the receiver holes 50 until the lifting eyes are attached to the hoisting lines 10. This advantageously allows each lifting eye 20 to be inserted through the respective receiver hole 50 in the truck body floor 4 and remain in place while the other lifting eyes are inserted. Moreover, once all of the lifting eyes 20 are disposed in their respective receiver holes 50, the operator can attach each of the hoisting lines 10 to a corresponding lifting eye 20 from within the truck body 2, safely standing on the truck body floor 4. This is considerably safer than attaching the hoisting lines 10 to the side wails 8 of the truck body, which can be fifteen feet or more above the ground. The illustrated retainer is formed by a retaining, rod 66 that is inserted through a hole 68 in the lifting eye 20. The retaining rod 66 is longer than the diameter of the opening 54 of the receiver hole 50, as clearly shown in FIG. 5. Accordingly, with the lifting eye 20 in place, the retaining rod 66 is inserted through the hole 68 and prevents the lifting eye 20 from falling back through the receiver hole 50.

An operator can then begin to connect the lifting eyes 20 to the corresponding hoisting lines 10. As set forth above and shown in FIGS. 6 and 7, connection of the lifting eye 20 to the hoisting line 10 can be accomplished using an anchor shackle 60 and corresponding pin 64. With the hoisting line 10 extended to the lifting device, the lifting eye 20 is rotated to align with the angle of the hoisting line 10 by movement of the bearing surface 42 of the support base 22 within the receiving surface 58 of the reinforcement plate 56. After the hoisting lines 10 are connected to the lifting eyes 20, the retaining rods 66 can be removed from the retaining eyelets 68, if desired.

An advantage of the lifting system is that the lifting eyes 20 need not be permanently installed in the truck body floor 4. Accordingly, after the truck body 2 has been removed from the truck chassis, the necessary work completed, and the truck body 2 can be placed back on the truck chassis, the lifting eyes 20 can be removed from the receiver holes 50. Moreover, since the presence of receiver holes 50 in the truck body floor 4 may be disadvantageous in many work environments, the receiver holes 50 can be plugged with a hole closure device 70.

Two embodiments of hole closure devices 70 are shown in FIGS. 8 and 9, and FIGS. 10 and 11, respectively. Each of these hole closure devices 70 includes a cover plate 72 that sits within the opening 54 of the truck body floor 4 so as to act as a part of the truck body floor 4 during normal operation of the truck. Preferably, the top surface of the cover plate 72, in the installed position, is level with the surface of the truck body floor 4 so that the interior of the truck body is relatively smooth. The installed cover plate 72 is supported from below by the reinforcement plate 56. Further, a retention bar 74 holds the cover plate 72 in place to prevent it from popping up out of the receiver hole 50 during operation. In the embodiment shown in FIGS. 8 and 9, the retention bar 74 is secured to the cover plate 72 using two threaded bolts 76 attached to a bottom surface of the cover plate 72. The bolts 76 are inserted through two bores 78 in the retention bar 74 which is tightened toward the cover plate 72 using nuts 80. Due to its size, the retention bar 74 is prevented from passing through the reinforcement plate 56, and accordingly the hole closure device 70 is securely fastened on opposite sides of the reinforcement plate 56.

Figure 10:
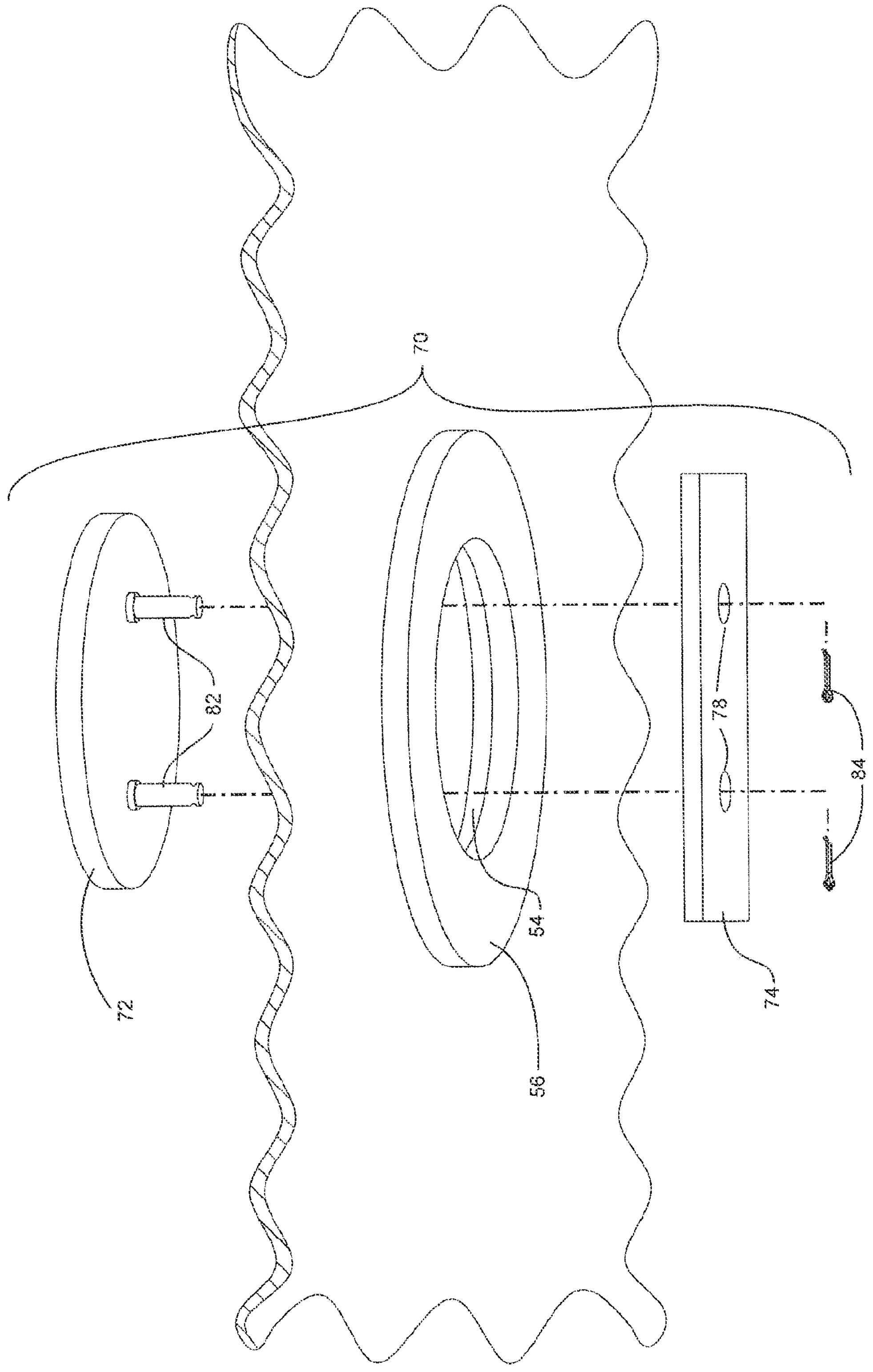
FIG. 10 is an exploded view of another closure device used with a receiver hole in a truck body floor.
Figure 11:
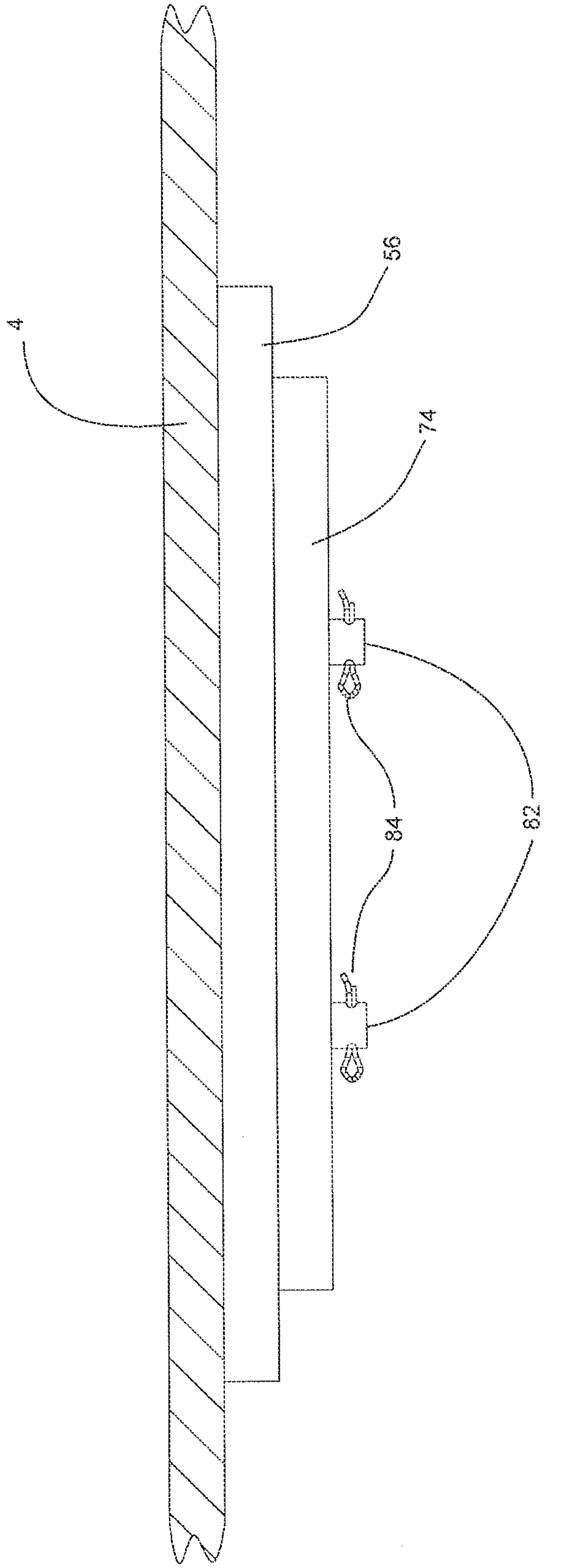
FIG. 11 is a side view of the closure device of FIG. 10 in an assembled position.

The embodiment shown in FIGS. 10 and 11 operates similarly, but the cover plate 72 is fastened to the retention bar 78 using an alternative method. Instead of using bolts 76 and nuts 80, the embodiment of FIGS. 10 and 11 uses shafts 82 that include apertures for receiving cotter pins 84. Other retention methods are also possible.

While the invention has been particularly shown and described with reference to preferred embodiments thereof, it will be understood by those skilled in the art that various changes in form and details may be made therein without departing from the spirit and scope of the invention.

The invention claimed is:

1. A system for lifting a truck body, the system comprising:

a plurality of receiver holes disposed in a floor of the truck body, each receiver hole including an opening extending through the truck body floor;

a plurality of rigid lifting eyes, each rigid lifting eye including a bearing surface and an attachment for connecting to a hoisting line, each rigid lifting eye mating to and extending through the opening of one of the plurality of receiver holes with the bearing surface engaging an underside of the floor such that the respective rigid lifting eye is rotatable about horizontal and vertical axes and the lifting eye is configured to lift the truck body when a lifting force is applied to the rigid lifting eye.

2. The system of claim 1, wherein each lifting eye includes a support base including the bearing surface thereon and a post extending up from the support base through the respective receiver hole.

3. The system of claim 2, wherein each lifting eye includes a retainer configured to hold the lifting eye in the respective receiver hole and prevent the lifting eye from falling down through the truck body floor.

4. The system of claim 3, wherein the retainer includes an eyelet disposed in the post of the lifting eye and a retaining rod inserted through the eyelet, a length of the retaining rod being larger than the passage of the receiver hole.

5. The system of claim 1, wherein each receiver hole includes a receiving surface configured to mate with the bearing surface of the corresponding lifting eye.

6. The system of claim 5, wherein each bearing surface is spherical to accommodate tilting of the lifting eye within the respective receiver hole.

7. The system of claim 5, wherein each receiver hole includes an annular reinforcement plate disposed below the truck body floor around the passage of the receiver hole, and wherein the receiving surface is formed by the reinforcement plate.

8. The system of claim 1, further comprising a cover plate corresponding to each receiver hole, the cover plates being configured to close the respective receiver holes when the corresponding temporary lifting eyes are removed from the respective receiver holes.

9. The system of claim 1, wherein each lifting eye includes two plates substantially disposed at a right angle from one another and forming a support base of the lifting eye.

10. The system of claim 9, wherein the two plates of each lifting eye include a primary plate extending up from the support base so as to form a post, and wherein the attachment is included in the post formed by the primary plate.

11. The system of claim 1, wherein each lifting eye includes sectional plates including a primary plate extending up from a support base so as to form a post, and wherein the attachment is included in the post formed by the primary plate.

12. A method of lifting a truck body, the method comprising:

providing a truck body including a truck body floor;

providing a plurality of receiver holes in the truck body floor, each receiver hole including a receiving surface and a passage extending through the truck body floor;

inserting a rigid temporary lifting eye into each of the receiver holes from below the truck body floor so that a support base of the rigid lifting eye is disposed below the truck body floor, a shape of the support base of the rigid lifting eye preventing movement of the support base through the passage of the respective receiver hole, and the rigid lifting eye further including an attachment that is accessible from above the truck body floor;

connecting a hoisting line to the attachment of each rigid lifting eye; and pulling the hoisting lines so as to lift the truck body which is supported by the plurality of rigid lifting eyes at the truck body floor.

13. The method of claim 12, wherein providing the plurality of receiver holes in the truck body floor is carried out during manufacturing of the truck body.

14. The method of claim 12, wherein the truck body is existing and used and the providing the plurality of receiver holes in the truck body floor is performed as a retro-fitting so as to provide a lifting system to the existing and used truck body.

15. The method of claim 12, wherein each lifting eye includes a post extending up from the support base through the respective receiver hole, and wherein the respective attachment is disposed on the post.

16. The method of claim 15, wherein each receiver hole includes a receiving surface and the respective support base includes a corresponding spherical bearing surface, each bearing surface being configured to engage the respective receiving surface.

17. The method of claim 16, further comprising tilting each lifting eye by rotating the bearing surface of the respective support base within the corresponding receiving surface so as to align the lifting eye with the respective hoisting line.

18. The method of claim 15, further comprising, prior to connecting the hoisting line to the lifting eye attachment, assembling a retainer disposed on the post of the lifting eye at a position above the truck body floor in order to prevent the lifting eye from falling through the truck body floor.

19. The method of claim 18, wherein each retainer includes an eyelet disposed in the post of the lifting eye and a retaining rod inserted through the eyelet, a length of the retaining rod being longer than the passage of the respective receiver hole.

20. The method of claim 12, further comprising removing each of the lifting eyes from the receiver holes, and disposing a cover plate in each receiver hole so as to close the receiver hole.

21. The method of claim 12, wherein each lifting eye includes two plates substantially disposed at a right angle from one another and forming the support base.

* * * * *